United States Patent
Liang et al.

(10) Patent No.: US 12,465,205 B1
(45) Date of Patent: Nov. 11, 2025

(54) DENTAL IMAGE DISPLAY METHOD AND DENTAL HANDPIECE

(71) Applicant: Central South University, Changsha (CN)

(72) Inventors: Ye Liang, Changsha (CN); Qian Wang, Changsha (CN); Canhua Jiang, Changsha (CN); Yutian Zheng, Changsha (CN); Wenjie Ren, Changsha (CN); Zihao Liu, Changsha (CN); Peixuan Liu, Changsha (CN); Ai Jian, Changsha (CN); Can Lu, Changsha (CN)

(73) Assignee: Central South University, Changsha (CN)

( * ) Notice: Subject to any disclaimer, the term of this patent is extended or adjusted under 35 U.S.C. 154(b) by 0 days.

(21) Appl. No.: 19/198,142

(22) Filed: May 5, 2025

(30) Foreign Application Priority Data

Oct. 16, 2024 (CN) .......................... 202411447228.5

(51) Int. Cl.
*A61B 1/247* (2006.01)
*A61B 1/00* (2006.01)

(52) U.S. Cl.
CPC ........ *A61B 1/247* (2013.01); *A61B 1/000094* (2022.02); *A61B 1/00045* (2013.01); *A61B 1/00194* (2022.02)

(58) Field of Classification Search
CPC .............. A61B 1/247; A61B 1/000094; A61B 1/00045; A61B 1/00194
USPC ......................................................... 348/66
See application file for complete search history.

(56) References Cited

U.S. PATENT DOCUMENTS

| | | | |
|---|---|---|---|
| 6,152,731 A * | 11/2000 | Jordan .................... | A61C 11/00 433/69 |
| 10,390,913 B2 * | 8/2019 | Sabina ............... | A61B 1/00172 |
| 11,141,249 B2 * | 10/2021 | Evans .................. | A61C 17/228 |
| 11,563,929 B2 * | 1/2023 | Saphier .................. | G01B 11/25 |
| 2008/0057466 A1 * | 3/2008 | Jordan ................. | A61C 9/0046 433/69 |
| 2017/0065370 A1 * | 3/2017 | Nakai ................... | A61B 5/0066 |
| 2019/0231490 A1 * | 8/2019 | Sabina ............... | A61B 1/00194 |
| 2021/0085436 A1 * | 3/2021 | Evans ................ | A61C 17/0211 |

(Continued)

FOREIGN PATENT DOCUMENTS

| | | |
|---|---|---|
| CN | 111655191 A | 9/2020 |
| CN | 113677292 A | 11/2021 |
| CN | 114007542 A | 2/2022 |

*Primary Examiner* — Christopher S Kelley
*Assistant Examiner* — Asmamaw G Tarko
(74) *Attorney, Agent, or Firm* — Nitin Kaushik (57) ABSTRACT

The present invention relates to the technical field of dental image display. It provides a dental image display method and a dental handpiece. First, a 3D tooth image is formed via scanning. Then, at each moving position, a light-sensing component and a first camera respectively collect the first and second partial dental arch images, and a positional association is established between them. When the dental handpiece operates in the oral cavity, a second camera captures a real-time image. Based on this image, the partial dental arch image targeted by the handpiece's working component is determined and displayed on the handpiece's screen. This invention overcomes the prior-art problem of blocked sight during operation, facilitating the doctor's work and enabling the handpiece to function as an oral mirror.

6 Claims, 8 Drawing Sheets

---

Obtain a three-dimensional tooth image formed by scanning an oral cavity of a patient by using a light sensing component of an intraoral scanner

↓

Obtain a first local dental arch image collected by the light sensing component at each moving position when the light sensing component of the intraoral scanner moves along a dental arch, and obtain a second local dental arch image collected by a first camera at each moving position

↓

Establish a positional association between the first local dental arch image and the second local dental arch image that are collected at each moving position, to form paired data

↓

Obtain a first real-time image collected by a second camera when a dental handpiece is operated in the oral cavity, and query the paired data according to the first real-time image, to determine a local dental arch image aligned by a working component of the dental handpiece

↓

Display the local dental arch image aligned by the working component of the dental handpiece on a display screen of the dental handpiece (56) References Cited

U.S. PATENT DOCUMENTS

| | | | | |
|---|---|---|---|---|
| 2021/0137653 | A1* | 5/2021 | Saphier | G06T 19/20 |
| 2022/0265406 | A1* | 8/2022 | Evans | A61C 17/0202 |
| 2024/0023800 | A1* | 1/2024 | Fridman | A61B 1/00052 |
| 2024/0407896 | A1* | 12/2024 | Evans | A61C 17/0208 |
| 2025/0025035 | A1* | 1/2025 | Fridman | A61C 9/0053 |
| 2025/0120795 | A1* | 4/2025 | Fridman | A61B 1/00016 |

* cited by examiner

Obtain a three-dimensional tooth image formed by scanning an oral cavity of a patient by using a light sensing component of an intraoral scanner

↓

Obtain a first local dental arch image collected by the light sensing component at each moving position when the light sensing component of the intraoral scanner moves along a dental arch, and obtain a second local dental arch image collected by a first camera at each moving position

↓

Establish a positional association between the first local dental arch image and the second local dental arch image that are collected at each moving position, to form paired data

↓

Obtain a first real-time image collected by a second camera when a dental handpiece is operated in the oral cavity, and query the paired data according to the first real-time image, to determine a local dental arch image aligned by a working component of the dental handpiece

↓

Display the local dental arch image aligned by the working component of the dental handpiece on a display screen of the dental handpiece

DENTAL IMAGE DISPLAY METHOD AND DENTAL HANDPIECE

CROSS-REFERENCE TO RELATED APPLICATIONS

The application claims priority to Chinese patent application No. 202411447228.5, filed on Oct. 16, 2024, the entire contents of which are incorporated herein by reference.

TECHNICAL FIELD

The present invention relates to the technical field of dental image display, and specifically, to a dental image display method and a dental handpiece.

BACKGROUND

A mouth mirror, also known as an intraoral camera or an endoscope, is a professional apparatus used in the field of stomatology, which is primarily for capturing high-definition images or videos of the inside of the oral cavity and can assist doctors or dentists in making more accurate diagnoses and treatments of oral diseases.

There are three commonly used dental mouth mirrors: front surface mouth mirrors (also referred to as surface mouth mirrors), concave mouth mirrors, and flat surface mouth mirrors. There are also double-sided mirrors and the like, which are not commonly used clinically.

Mouth mirrors have multiple uses including:
obtaining indirect view fields and indirect lighting;
pulling soft tissue, such as blocking the tongue or pulling the corners of the mouth to obtain a better view field and a safer intraoral operating environment; and
checking and diagnosing whether the patient has dead pulp teeth, cracked teeth, fractured teeth, and the like through trans-illumination.

One of the significant uses is obtaining indirect view fields. Obtaining indirect view fields refers to using the dental mouth mirror to observe the tooth surface that cannot be seen directly or the intraoral structure. The operator can see dental instruments in the mouth mirror.

An oral handpiece is also called a dental handpiece. Different from the commonly-used phone in life, the oral medical handpiece is a medical instrument dedicated to the stomatological department for cleaning tartar, grinding caries and bad teeth, or performing alveolar bone surgery.

The dental handpiece is an important tool for cleaning, repairing, and treating teeth in dental diagnosis and treatment. Although the design of the dental handpiece has been continuously improved, in actual use, the dental handpiece itself may also block the operating position in the oral cavity of the patient, thereby blocking a working view field of the doctor, which is inconvenient for the doctor to perform intraoral operations.

Therefore, in the prior art, the sight line is blocked when the doctor operates the dental handpiece, which is inconvenient for the operation.

SUMMARY

A main purpose of the present invention is to provide a dental image display method, aiming to solve a disadvantage that a sight line is blocked when a doctor operates the dental handpiece in the prior art, which is inconvenient for an operation.

To achieve the above purpose, the present invention provides a dental image display method, where an intraoral scanner is provided with a light sensing component and a first camera disposed on a back surface of the light sensing component; a dental handpiece includes a main structure, one end of the main structure is provided with a working end of the dental handpiece, the other end thereof is a handheld end, a display screen is disposed between the working end and the handheld end that are of the dental handpiece, a working component is disposed on a front surface of the working end of the dental handpiece, and a second camera is disposed on a back surface of the working end; a positional relationship of the second camera relative to the working component of the dental handpiece is the same as that of the first camera relative to the light sensing component; the dental handpiece and the intraoral scanner are communicatively connected to a processing module respectively, to execute the method by using the processing module; and the method includes the following steps:

obtaining a three-dimensional tooth image formed by scanning an oral cavity of a patient by using the light sensing component of the intraoral scanner;

obtaining a first local dental arch image collected by the light sensing component at each moving position when the light sensing component of the intraoral scanner moves along a dental arch, and obtaining a second local dental arch image collected by the first camera at each moving position, where the first local dental arch image is a local image of one of an upper dental arch and a lower dental arch in the three-dimensional tooth image, and the second local dental arch image is a local image of the other one of the upper dental arch and the lower dental arch in the three-dimensional tooth image;

establishing a positional association between the first local dental arch image and the second local dental arch image that are collected at each moving position, to form paired data;

obtaining a first real-time image collected by the second camera when the dental handpiece is operated in the oral cavity, and querying the paired data according to the first real-time image, to determine a local dental arch image aligned by the working component of the dental handpiece; and displaying the local dental arch image aligned by the working component of the dental handpiece on the display screen of the dental handpiece.

Preferably, a third camera is further disposed on one side, close to the working end, of the dental handpiece, and the third camera is configured to shoot an image of the working component mounted at the working end of the dental handpiece; the method further includes:

obtaining a second real-time image collected by the third camera when the dental handpiece is operated in the oral cavity, where the second real-time image is a working image of the working component mounted at the working end of the dental handpiece in a local dental arch; and the step of displaying the local dental arch image aligned by the working component of the dental handpiece on the display screen of the dental handpiece includes:

obtaining a display image of the working component in the local dental arch through processing according to the local dental arch image aligned by the working component of the dental handpiece and the second real-time image; and displaying the display image of the working component in the local dental arch on the display screen of the dental handpiece.

Preferably, a fourth camera configured to collect a doctor image is disposed at the handheld end of the dental handpiece; and the method further includes:
  establishing a three-dimensional coordinate system according to the three-dimensional tooth image;
  calculating positional coordinates of the working end of the dental handpiece in the three-dimensional coordinate system by using the first real-time image obtained by the second camera when the working end of the dental handpiece moves at different positions in the oral cavity; establishing the doctor image in the three-dimensional coordinate system by using the doctor image collected by the fourth camera, to determine doctor coordinates and determine a doctor sight line range;
  recognizing a diseased region from the three-dimensional tooth image, and extracting diseased region coordinates, where the diseased region includes a diseased tooth and surrounding tissue of the diseased tooth;
  calculating sight line blind region coordinates of the three-dimensional tooth image relative to the doctor coordinates; and
  displaying the local dental arch image aligned by the working component of the dental handpiece and the first real-time image collected by the second camera on the display screen when the positional coordinates of the working end of the dental handpiece are located at an overlapped region between the sight line blind region coordinates and the diseased region coordinates.

Preferably, the step of establishing a three-dimensional coordinate system according to the three-dimensional tooth image includes:
  establishing a reference surface in the three-dimensional tooth image based on the lower dental arch, and determining a direction of an x axis of the three-dimensional coordinate system in the reference surface based on a central line of the lower dental arch;
  determining a direction of a y axis of the three-dimensional coordinate system in the reference surface based on a direction that is from a left tooth socket to a right tooth socket;
  determining a direction of a z axis of the three-dimensional coordinate system based on a direction that is perpendicular to the x axis and the y axis respectively; and
  establishing the three-dimensional coordinate system according to the direction of the x axis, the direction of the y axis, the direction of the z axis, and a selected coordinate origin.

Preferably, the step of establishing the doctor image in the three-dimensional coordinate system by using the doctor image collected by the fourth camera, to determine doctor coordinates and determine a doctor sight line range includes:
  obtaining the doctor image collected by the fourth camera at each set moment;
  obtaining a position of the working end of the dental handpiece in the three-dimensional coordinate system at each set moment;
  converting the doctor image at each set moment to the three-dimensional coordinate system according to the positional coordinates of the working end of the dental handpiece in the three-dimensional coordinate system, to determine the doctor coordinates; and
  determining the doctor sight line range according to the doctor coordinates and a set observation view angle.

Preferably, the step of calculating sight line blind region coordinates of the three-dimensional tooth image relative to the doctor coordinates includes:
  simulating a coverage situation of the three-dimensional tooth image in an oral environment according to the three-dimensional tooth image; and
  determining the sight line blind region coordinates of a doctor according to the doctor sight line range and the coverage situation of the three-dimensional tooth image in the oral environment.

Preferably, the method further includes:
  calculating a view angle deviation between the doctor coordinates and the three-dimensional tooth image; and
  calculating a comfortable display angle, adjusted according to the view angle deviation, of the three-dimensional tooth image; and
  the step of displaying the local dental arch image aligned by the working component of the dental handpiece and the first real-time image collected by the second camera on the display screen when the positional coordinates of the working end of the dental handpiece are located at an overlapped region between the sight line blind region coordinates and the diseased region coordinates includes:
  displaying, according to the comfortable display angle, the local dental arch image aligned by the working component of the dental handpiece and the first real-time image collected by the second camera on the display screen when the positional coordinates of the working end of the dental handpiece are located at the overlapped region between the sight line blind region coordinates and the diseased region coordinates.

Preferably, the step of calculating a view angle deviation between the doctor coordinates and the three-dimensional tooth image includes:
  establishing a first reference direction based on a sight line direction that is determined according to the doctor coordinates;
  establishing a second reference direction based on a front-rear direction of the three-dimensional tooth image;
  obtaining an operating included angle between the first reference direction and the second reference direction; and
  using the operating included angle as the view angle deviation.

Preferably, the step of determining the doctor sight line range according to the doctor coordinates and a set observation view angle includes:
  obtaining binoculus coordinates of the doctor, and calculating binoculus midpoint coordinates of the doctor and the sight line direction of the doctor according to the binoculus coordinates of the doctor; and
  constructing the doctor sight line range in the three-dimensional coordinate system according to the set observation view angle, the binoculus midpoint coordinates of the doctor, and the sight line direction of the doctor; and
  the step of determining the sight line blind region coordinates of a doctor according to the doctor sight line range and the coverage situation of the three-dimensional tooth image in the oral environment includes:
  displaying the coverage situation of the three-dimensional tooth image in the oral environment in the three-dimensional coordinate system;

determining a sight line blind region range of the doctor according to the coverage situation of the three-dimensional tooth image in the oral environment and a blocking range for the doctor sight line range, and calculating the sight line blind region coordinates of the doctor according to a coordinate point within the sight line blind region range.

To achieve the above purpose, the present invention further provides a dental handpiece, where the dental handpiece is communicatively connected to a processing module, and the processing module is communicatively connected to an intraoral scanner; the intraoral scanner is provided with a light sensing component and a first camera disposed on a back surface of the light sensing component; the dental handpiece includes a main structure, one end of the main structure is provided with a working end of the dental handpiece, the other end thereof is a handheld end, a display screen is disposed between the working end and the handheld end that are of the dental handpiece, a working component is disposed on a front surface of the working end of the dental handpiece, and a second camera is disposed on a back surface of the working end; a positional relationship of the second camera relative to the working component of the dental handpiece is the same as that of the first camera relative to the light sensing component; and the processing module is configured to execute the method.

In a technical solution of the present invention, the intraoral scanner is provided with the light sensing component configured to scan the three-dimensional tooth image, and the first camera is disposed on the back surface of the light sensing component. The dental handpiece is divided into two ends, where one end is the handheld end that is convenient for the doctor to operate by hand, and the other end is the working end that can extend into the oral cavity to be configured to operate on a tooth. The handheld end is connected to the display screen, the working component is disposed on the front surface of the working end of the dental handpiece, and the second camera is disposed on the back surface of the working end. After the intraoral scanner scans to form the three-dimensional tooth image of the patient, the doctor uses the light sensing component of the intraoral scanner to move along the dental arch in the oral cavity, so that the light sensing component collects the first local dental arch image of one of the upper dental arch and the lower dental arch at each moving position, and the first camera on the back surface of the light sensing component collects the second local dental arch image of the other one of the upper dental arch and the lower dental arch at each moving position. Therefore, the first local dental arch image and the second local dental arch image that are at the same moving position may be associated, to establish the paired data, which is equivalent to knowing one of the two to determine the other. The working component is disposed on the front surface of the working end of the dental handpiece, the second camera is disposed on the back surface of the working end, and the positional relationship of the second camera relative to the working component of the dental handpiece is the same as that of the first camera relative to the light sensing component. Therefore, when the doctor uses the dental handpiece to operate in the oral cavity, the working component of the working end of the dental handpiece is aligned to one local dental arch image, but the local dental arch image is blocked by the working component, and the second camera can collect the first real-time image, so that the local dental arch image aligned by the working component of the dental handpiece can be determined by querying the paired data according to the first real-time image. The local dental arch image aligned by the working component of the dental handpiece is displayed on the display screen of the dental handpiece, so that a dental arch position image blocked by the working component of the dental handpiece can be displayed, which helps solve a technical problem that the sight line is blocked when the doctor operates the dental handpiece, which is inconvenient for an operation, thereby enabling the dental handpiece to implement the function of the mouth mirror by using the display screen.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and those of ordinary skill in the art may derive other drawings from these accompanying drawings without creative efforts.

REFERENCE NUMERALS IN THE DRAWINGS 1. main structure; 2. sleeve ring; 3. display screen; 4. second connecting structure; 5. first connecting structure; 6. working end; 7. second camera; 8. handheld end; 9. working component; 10. intraoral scanner; 11. light sensing component; 12. first camera; 13. third camera; 14. fourth camera.

DETAILED DESCRIPTION OF THE EMBODIMENTS

The following clearly and completely describes the technical solutions in the embodiments of the present invention with reference to the accompanying drawings in the embodiments of the present invention. Apparently, the described embodiments are merely some rather than all of the embodiments of the present invention. All other embodiments obtained by those of ordinary skill in the art based on the embodiments of the present invention without creative efforts shall fall within the protection scope of the present invention.

Figure 1:
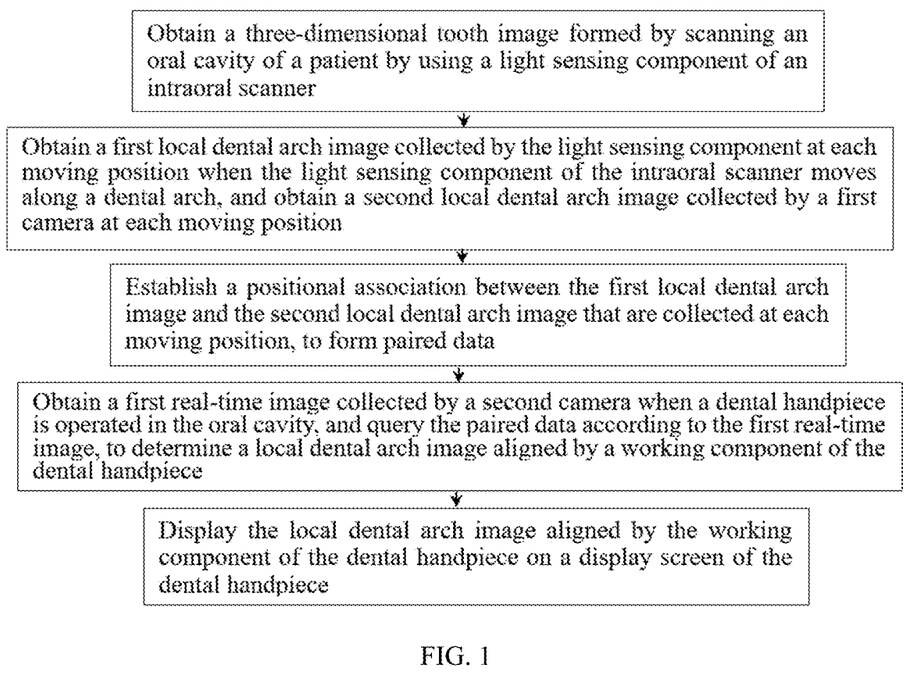
FIG. 1 is a flowchart of a dental image display method according to an embodiment of the present invention.

Referring to FIG. 1 to FIG. 8, to achieve the above purpose, a first embodiment of the present invention provides a dental image display method. An intraoral scanner 10 is provided with a light sensing component 11 and a first camera 12 disposed on a back surface of the light sensing component 11. A dental handpiece includes a main structure 1, one end of the main structure 1 is provided with a working end 6 of the dental handpiece, the other end thereof is a handheld end 8, a display screen 3 is disposed between the working end 6 and the handheld end 8 that are of the dental handpiece, a working component 9 is disposed on a front surface of the working end 6 of the dental handpiece, and a second camera 7 is disposed on a back surface of the working end 6. A positional relationship of the second camera 7 relative to the working component 9 of the dental handpiece is the same as that of the first camera 12 relative to the light sensing component 11. The dental handpiece and the intraoral scanner 10 are communicatively connected to a processing module respectively, to execute the method by using the processing module. The method includes the following steps:

step S100: obtaining a three-dimensional tooth image formed by scanning an oral cavity of a patient by using the light sensing component 11 of the intraoral scanner 10;

step S200: obtaining a first local dental arch image collected by the light sensing component 11 at each moving position when the light sensing component 11 of the intraoral scanner 10 moves along a dental arch, and obtaining a second local dental arch image collected by the first camera 12 at each moving position, where the first local dental arch image is a local image of one of an upper dental arch and a lower dental arch in the three-dimensional tooth image, and the second local dental arch image is a local image of the other one of the upper dental arch and the lower dental arch in the three-dimensional tooth image;

step S300: establishing a positional association between the first local dental arch image and the second local dental arch image that are collected at each moving position, to form paired data;

step S400: obtaining a first real-time image collected by the second camera 7 when the dental handpiece is operated in the oral cavity, and querying the paired data according to the first real-time image, to determine a local dental arch image aligned by the working component 9 of the dental handpiece; and step S500: displaying the local dental arch image aligned by the working component 9 of the dental handpiece on the display screen 3 of the dental handpiece.

In the technical solution of the present invention, the intraoral scanner 10 is provided with the light sensing component 11 configured to scan the three-dimensional tooth image, and the first camera 12 is disposed on the back surface of the light sensing component 11. The dental handpiece is divided into two ends, where one end is the handheld end 8 that is convenient for a doctor to operate by hand, and the other end is the working end 6 that can extend into the oral cavity to be configured to operate on a tooth. The handheld end 8 is connected to the display screen 3, the working component 9 is disposed on the front surface of the working end 6 of the dental handpiece, and the second camera 7 is disposed on the back surface of the working end 6. After the intraoral scanner 10 scans to form the three-dimensional tooth image of the patient, the doctor uses the light sensing component 11 of the intraoral scanner 10 to move along the dental arch in the oral cavity, so that the light sensing component 11 collects the first local dental arch image of one of the upper dental arch and the lower dental arch at each moving position, and the first camera 12 on the back surface of the light sensing component 11 collects the second local dental arch image of the other one of the upper dental arch and the lower dental arch at each moving position. Therefore, the first local dental arch image and the second local dental arch image that are at the same moving position may be associated, to establish the paired data, which is equivalent to knowing one of the two to determine the other. The working component 9 is disposed on the front surface of the working end 6 of the dental handpiece, the second camera 7 is disposed on the back surface of the working end 6, and the positional relationship of the second camera 7 relative to the working component 9 of the dental handpiece is the same as that of the first camera 12 relative to the light sensing component 11. Therefore, when the doctor uses the dental handpiece to operate in the oral cavity, the working component 9 of the working end 6 of the dental handpiece is aligned to one local dental arch image, but the local dental arch image is blocked by the working component 9, and the second camera 7 can collect the first real-time image, so that the local dental arch image aligned by the working component 9 of the dental handpiece can be determined by querying the paired data according to the first real-time image. The local dental arch image aligned by the working component 9 of the dental handpiece is displayed on the display screen 3 of the dental handpiece, so that a dental arch position image blocked by the working component 9 of the dental handpiece can be displayed, which helps solve a technical problem that the sight line is blocked when the doctor operates the dental handpiece, which is inconvenient for an operation, thereby enabling the dental handpiece to implement the function of the mouth mirror by using the display screen 3.

The dental handpiece includes but is not limited to: a dental pneumatic high-speed handpiece and a dental implantation handpiece. If the dental handpiece in the solution is replaced with a root canal motor or a teeth cleaner, this is also applicable.

Figure 3:
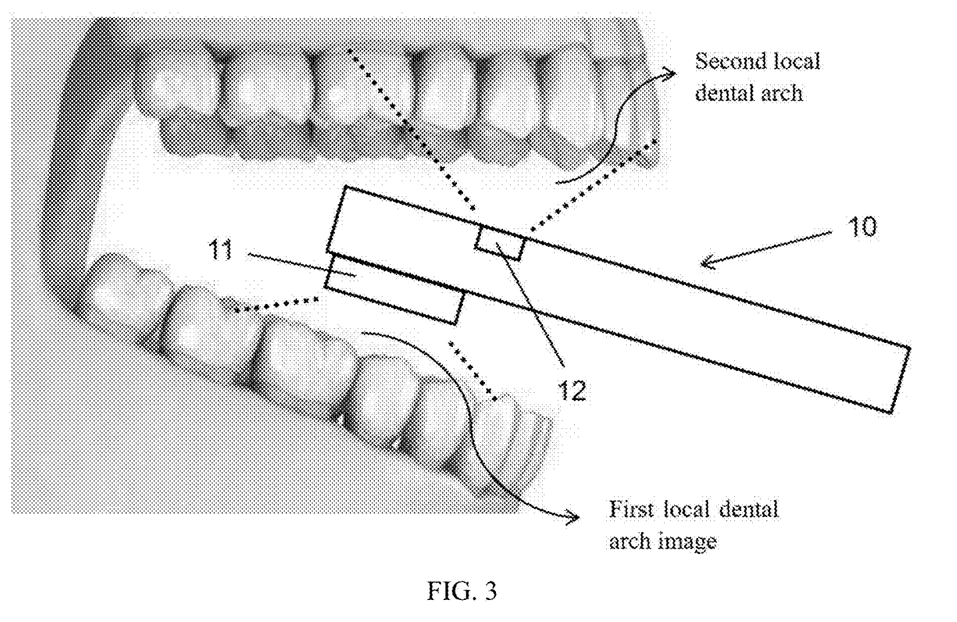
FIG. 3 is a schematic diagram in which an intraoral scanner collects a first local dental arch image and a second local dental arch image according to the present invention.

The intraoral scanner 10 is an intraoral three-dimensional scanning device and is provided with the light sensing component 11. A solution of forming the three-dimensional tooth image by scanning the oral cavity by using the light sensing component 11 is the prior art, which is not described herein in detail. In the present invention, one first camera 12 is added on one side, away from the light sensing component 11, of the intraoral scanner 10. After the three-dimensional tooth image is established, the intraoral scanner 10 is used to scan the inside of the oral cavity again. At this time, the light sensing component 11 collects an image, that is, the first local dental arch image, of one of the upper dental arch and the lower dental arch, and the first camera 12 collects an image, that is, the second local dental arch image, of the other one of the upper dental arch and the lower dental arch simultaneously. Therefore, a paired relationship is formed between the first local dental arch image and the second local dental arch image that are collected at the same moment. If one of the images in the paired relationship is known, the other image can be queried.

The main structure 1 of the dental handpiece and the intraoral scanner are provided with a data transmission interface respectively, to be communicatively connected to an external processing module through the data transmission interface. The processing module may be a computer.

Figure 5:
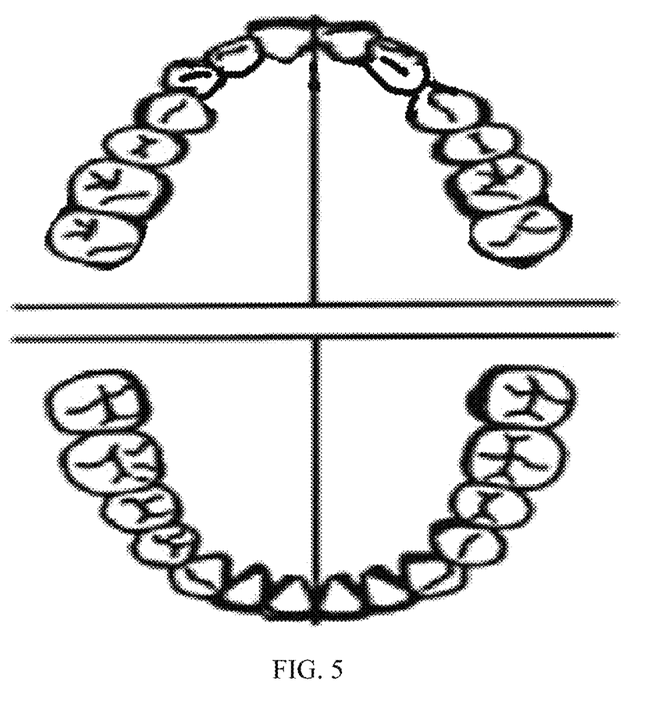
FIG. 5 is an upper dental arch image and a lower dental arch image according to the present invention.

As shown in FIG. 5, the three-dimensional tooth image includes an upper dental arch image and a lower dental arch image. Both the upper dental arch image and the lower dental arch image include: a tooth structure (the tooth structure reflects a basic structure, a lesional structure, and a repair structure that are of the tooth), a surrounding tissue structure of the tooth, and a tooth arrangement situation.

Figure 4:
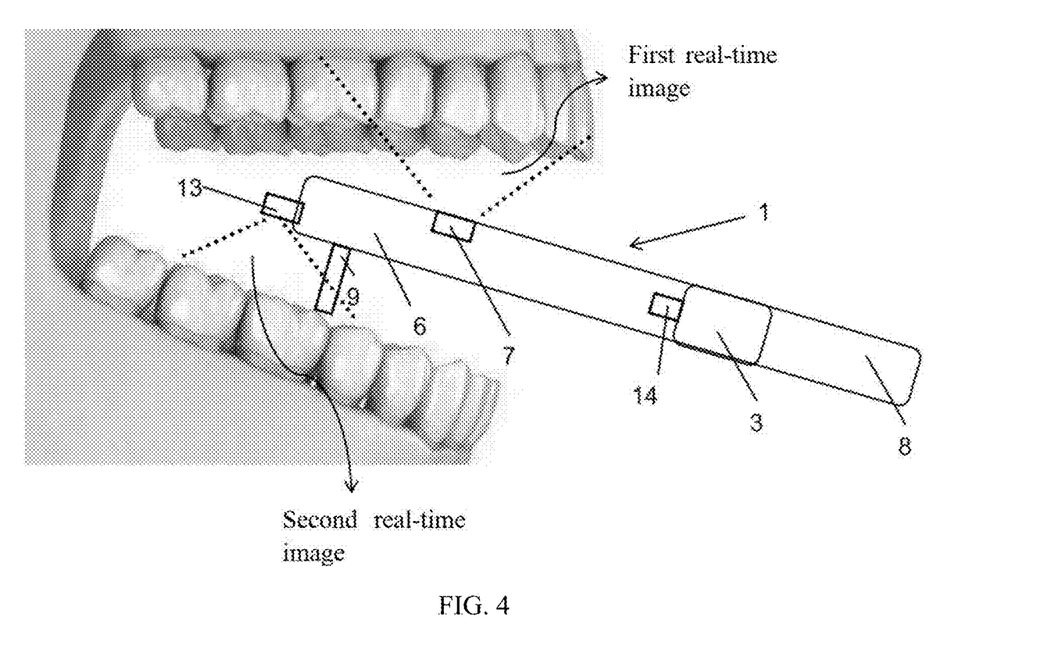
FIG. 4 is a schematic diagram in which a dental handpiece collects a first real-time image and a second real-time image according to the present invention.

The dental handpiece includes the main structure 1, the working component 9 is disposed on the front surface of the working end 6 of the dental handpiece, and the second camera 7 is disposed on the back surface of the working end 6. The positional relationship of the second camera 7 relative to the working component 9 of the dental handpiece is the same as that of the first camera 12 relative to the light sensing component 11. Therefore, the working end 6 of the dental handpiece faces an intraoral diseased region to be treated, to treat the diseased region (for example, performing grinding and hole drilling on the tooth), and the second camera 7 is configured to collect the first real-time image of the back surface of the working component 9. Since the positional relationship of the second camera 7 relative to the working component 9 of the dental handpiece is the same as that of the first camera 12 relative to the light sensing component 11, a local dental arch image that is on the other side and that is paired with the first real-time image can be queried by bringing the first real-time image collected by the second camera 7 into the paired relationship between the first local dental arch image and the second local dental arch image. In addition, "a local dental arch image that is on the other side" refers to the local dental arch image aligned by the working component 9 of the dental handpiece. This image is blocked by the working component 9 of the dental handpiece originally, making it inconvenient for the doctor to view the image. At present, this image is displayed on the display screen 3 of the dental handpiece, improving operation convenience of the doctor. In addition, the doctor does not need to adjust a sight line from viewing a situation in the oral cavity to viewing another large screen, which helps the doctor maintain a high concentration of attention and avoids reduced accuracy of a dental operation caused by switching the sight line from the oral cavity.

Based on the first embodiment of the present invention, in a second embodiment of the dental image display method of the present invention, a third camera 13 is further disposed on one side, close to the working end 6, of the dental handpiece, and the third camera 13 is configured to shoot an image of the working component 9 mounted at the working end 6 of the dental handpiece. The method further includes:
step S600: obtaining a second real-time image collected by the third camera 13 when the dental handpiece is operated in the oral cavity, where the second real-time image is a working image of the working component 9 mounted at the working end 6 of the dental handpiece in a local dental arch; and the step S500 includes:
step S510: obtaining a display image of the working component 9 in the local dental arch through processing according to the local dental arch image aligned by the working component 9 of the dental handpiece and the second real-time image; and
step S520: displaying the display image of the working component 9 in the local dental arch on the display screen 3 of the dental handpiece.

Specifically, the following three images may be displayed on the display screen 3:
Firstly, the local dental arch image paired with the first real-time image, that is, the local dental arch image aligned by the working component 9 of the dental handpiece is displayed. Since this manner is that a paired image is invoked from the paired data according to the first real-time image for display, a displayed image does not include the working component 9 of the dental handpiece.

Secondly, the display image of the working component 9 in the local dental arch is displayed on the display screen 3 of the dental handpiece. At this time, the second real-time image collected by the third camera 13 is displayed on the display screen 3, and an operation situation of the working component 9 in the diseased region may be seen.

Thirdly, 3D image processing is performed on images of the above first and second situations to obtain a 3D image of the local dental arch image aligned by the working component 9, and the 3D image may include the working component 9 or may not include the working component 9.

The doctor may select the above three images for selected display, and a selection button may be set on the dental handpiece for display switching.

Based on the first embodiment of the present invention, in a third embodiment of the dental image display method of the present invention, a fourth camera 14 configured to collect a doctor image is disposed at the handheld end 8 of the dental handpiece. The method further includes:
step S700: establishing a three-dimensional coordinate system according to the three-dimensional tooth image;
step S800: calculating positional coordinates of the working end 6 of the dental handpiece in the three-dimensional coordinate system by using the first real-time image obtained by the second camera 7 when the working end 6 of the dental handpiece moves at different positions in the oral cavity;
step S900: establishing the doctor image in the three-dimensional coordinate system by using the doctor image collected by the fourth camera 14, to determine doctor coordinates and determine a doctor sight line range;
step S1000: recognizing a diseased region from the three-dimensional tooth image, and extracting diseased region coordinates, where the diseased region includes a diseased tooth and surrounding tissue of the diseased tooth;
step S1100: calculating sight line blind region coordinates of the three-dimensional tooth image relative to the doctor coordinates; and
step S1200: displaying the local dental arch image aligned by the working component 9 of the dental handpiece and the first real-time image collected by the second camera 7 on the display screen 3 when the positional coordinates of the working end 6 of the dental handpiece is located at an overlapped region between the sight line blind region coordinates and the diseased region coordinates.

A target of this embodiment is that when operating the dental handpiece, the doctor also can obtain a good view field in the oral cavity even in a sight line blind region (generally, there is blocking at positions of the upper and lower dental arches). Therefore, in this embodiment, the overlapped region between the sight line blind region coordinates of the doctor and the diseased region coordinates is calculated, and in the overlapped region, the local dental arch image aligned by the working component 9 of the dental handpiece is displayed, and the first real-time image collected by the second camera 7 is further displayed. In this way, when the doctor is operating, upper and lower dental arch parts of an operation position can be displayed, and a better view field can be obtained compared with displaying an operation position of the working component of the dental handpiece separately.

Specifically, a diseased region part is extracted from the three-dimensional tooth image according to an image recognition technology, and the diseased region coordinates are formed according to coordinates of the diseased region part in the three-dimensional coordinate system.

Figure 6:
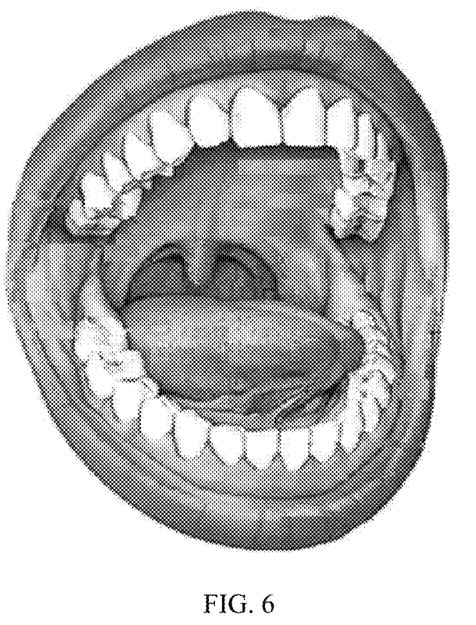
FIG. 6 is a coverage image of lip soft tissue for a dental arch generated through simulation according to a three-dimensional tooth image.

Referring to FIG. 6, FIG. 6 is a coverage image of lip soft tissue for a dental arch generated through simulation according to the three-dimensional tooth image.

Further, some tooth positions are located in the sight line blind region of the doctor due to a coverage effect of the soft tissue of the patient for the dental arch and a position of the doctor relative to the oral cavity. When moving in the oral cavity, the working end 6 of the dental handpiece is located at different oral positions. If it is detected that the working end 6 of the dental handpiece is located in the overlapped region between the sight line blind region coordinates of the doctor and the diseased region coordinates, three-dimensional images of positions corresponding to the upper and lower dental arches are displayed simultaneously by using the display screen 3, and a region within a sight line blind region range of the doctor may be presented by using the display screen 3, to facilitate observation and diagnosis of the doctor.

Figure 7:
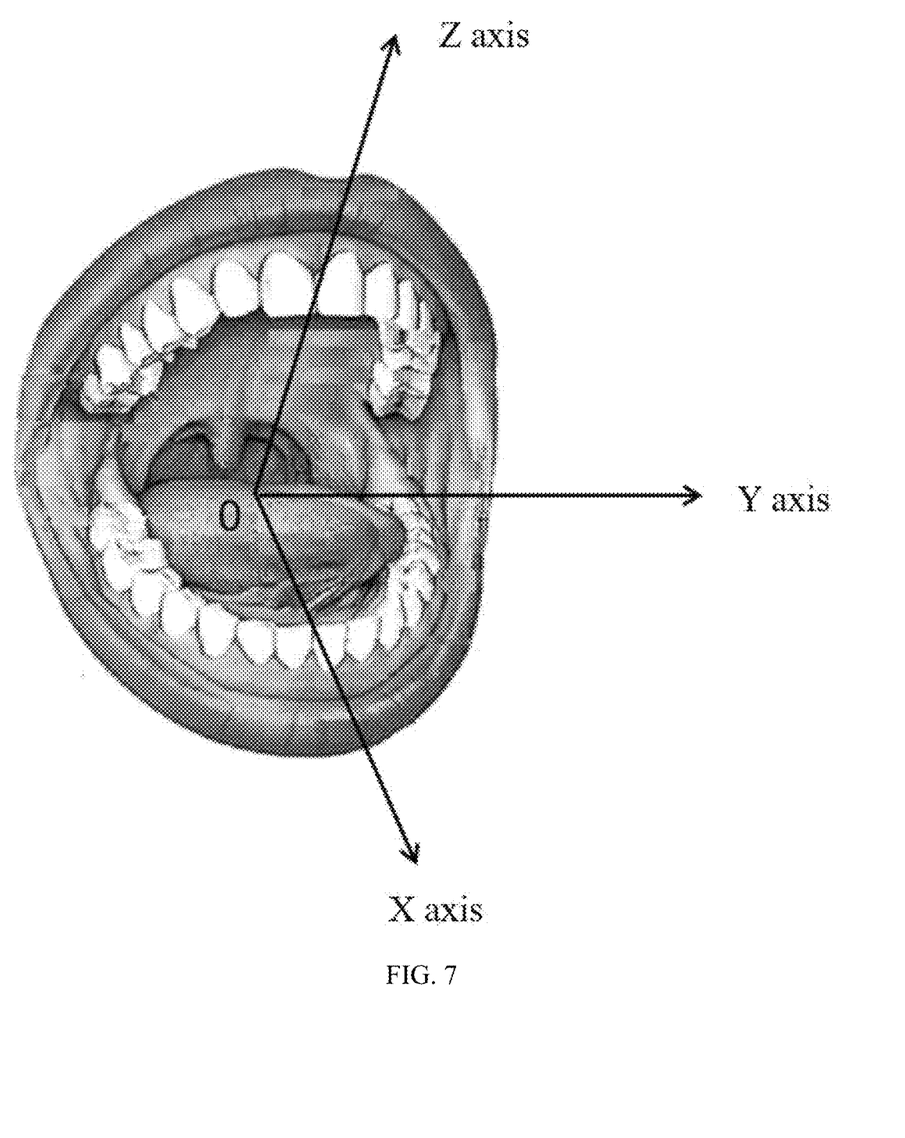
FIG. 7 is a schematic diagram of a three-dimensional coordinate system according to the present invention.

Based on the third embodiment of the present invention, in a fourth embodiment of the dental image display method of the present invention, the step S700 includes:
- step S710: establishing a reference surface in the three-dimensional tooth image based on the lower dental arch, and determining a direction of an x axis of the three-dimensional coordinate system in the reference surface based on a central line of the lower dental arch;
- step S720: determining a direction of a y axis of the three-dimensional coordinate system in the reference surface based on a direction that is from a left tooth socket to a right tooth socket;
- step S730: determining a direction of a z axis of the three-dimensional coordinate system based on a direction that is perpendicular to the x axis and the y axis respectively; and
- step S740: establishing the three-dimensional coordinate system according to the direction of the x axis, the direction of the y axis, the direction of the z axis, and a selected coordinate origin.

Referring to FIG. 7, specifically, the reference surface established based on the lower dental arch is a reference surface on which a curve shape of the lower dental arch is located.

The central line of the lower dental arch refers to a central line that divides the lower dental arch into the left tooth socket and the right tooth socket.

The selected coordinate origin may be located on the central line of the lower dental arch by default or determined according to an input of a user.

Based on the third embodiment of the present invention, in a fifth embodiment of the dental image display method of the present invention, the step S900 includes:
- step S910: obtaining the doctor image collected by the fourth camera 14 at each set moment;
- step S920: obtaining a position of the working end of the dental handpiece in the three-dimensional coordinate system at each set moment;
- step S930: converting the doctor image at each set moment to the three-dimensional coordinate system according to the positional coordinates of the working end of the dental handpiece in the three-dimensional coordinate system, to determine the doctor coordinates; and
- step S940: determining the doctor sight line range according to the doctor coordinates and a set observation view angle.

Specifically, a time start point at which the working end 6 of the dental handpiece starts working is detected, and after the time start point, the fourth camera 14 calculates a collection time point according to a preset collection cycle and quantity of collection times. Each collection time point is each set moment, and the doctor image is collected at each set moment.

It is easily understood that a position of the patient is fixed generally when the dental handpiece works, and the doctor is movable. In this embodiment, when the dental handpiece works, the doctor image is captured for a plurality of times, and a doctor static position obtained after a movable state is excluded may be determined according to a plurality of captured doctor images.

For a doctor static position at each set moment, the doctor static position is converted to the three-dimensional coordinate system according to positional coordinates of the dental handpiece at each set moment in the three-dimensional coordinate system (specifically, the positional coordinates of the working end 6 of the dental handpiece in the three-dimensional coordinate system is calculated. According to a doctor static image obtained by the fourth camera 14, a position of the doctor static image relative to the working end 6 of the dental handpiece is calculated, and then the doctor static image is converted to the three-dimensional coordinate system according to the positional coordinates of the working end 6 of the dental handpiece in the three-dimensional coordinate system), to determine the doctor coordinates in the three-dimensional coordinate system.

The observation view angle refers to a set maximum observation view angle along a sight line direction determined according to the doctor coordinates after considering that the doctor adjusting the sight line direction at a set angle by swinging a head, which may be set as required.

Based on the fifth embodiment of the present invention, in a sixth embodiment of the dental image display method of the present invention, the step S1100 includes:
- step S1110: simulating a coverage situation of the three-dimensional tooth image in an oral environment according to the three-dimensional tooth image; and
- step S1120: determining the sight line blind region coordinates of the doctor according to the doctor sight line range and the coverage situation of the three-dimensional tooth image in the oral environment.

Referring to FIG. 6, the originally generated three-dimensional tooth image is only upper and lower dental arch images, and a lip coverage effect is formed through simulation according to the upper and lower dental arch images. In the present invention, the sight line blind region of the doctor is mainly formed by blocking the tooth by the lip coverage effect.

Based on the sixth embodiment of the present invention, in a seventh embodiment of the dental image display method of the present invention, the method further includes:
- step S1300: calculating a view angle deviation between the doctor coordinates and the three-dimensional tooth image; and
- step S1400: calculating a comfortable display angle, adjusted according to the view angle deviation, of the three-dimensional tooth image; and
- the step S1200 includes:
- step S1210: displaying, according to the comfortable display angle, the local dental arch image aligned by the working component 9 of the dental handpiece and the first real-time image collected by the second camera 7 on the display screen 3 when the positional coordinates of the working end 6 of the dental handpiece is located at the overlapped region between the sight line blind region coordinates and the diseased region coordinates.

Figure 8:
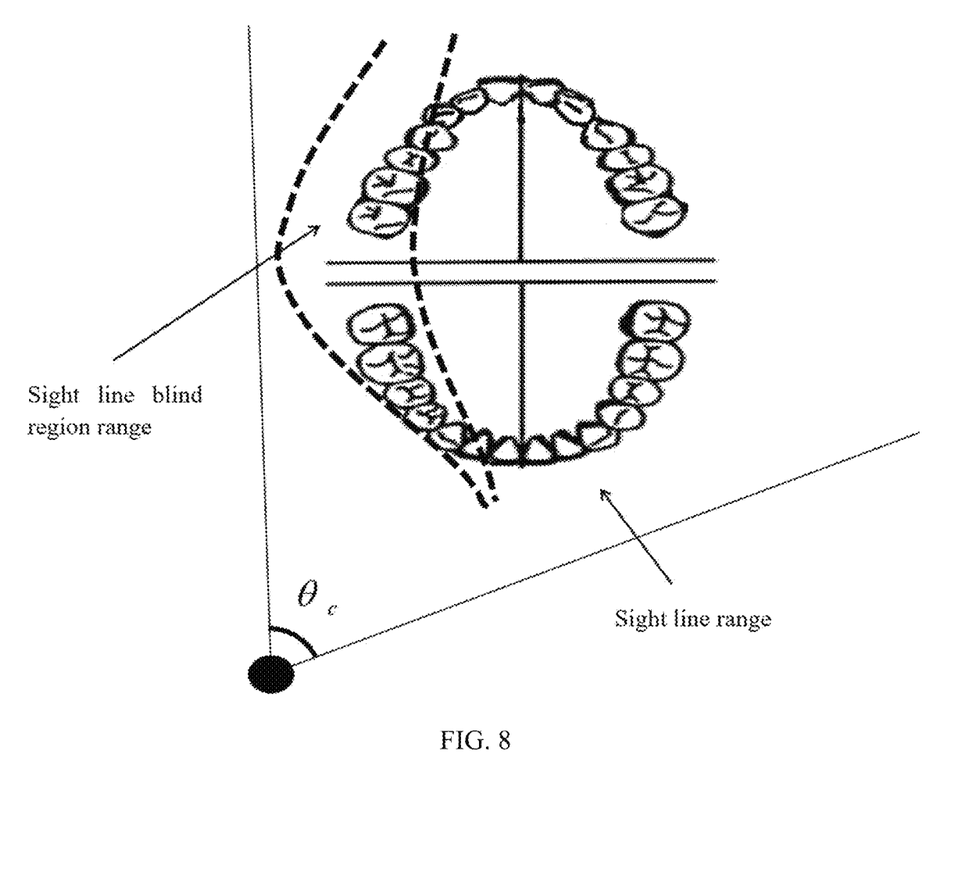
FIG. 8 is a schematic diagram of a sight line blind region and a sight line range.

Since the x axis, the y axis, and the z axis are established based on the three-dimensional tooth image, and a position of the doctor is at the side of the patient generally, for example, in FIG. 8, the doctor coordinates are located on a left side of the oral cavity, there is a view angle deviation between the doctor coordinates and the oral cavity of the patient. However, a display angle of the three-dimensional tooth image is consistent with an angle of the oral cavity of the patient, and therefore, there is also a view angle deviation between the doctor and the three-dimensional tooth image.

Under the influence of the view angle deviation, to ensure that a sight line of the doctor is consistent with the angle of the oral cavity of the patient as much as possible, the doctor may tilt a body of the doctor toward a corrected view angle direction as much as possible. Therefore, it is needed to twist the body of the doctor, for example, twist a head portion toward a direction of the oral cavity of the patient, thereby causing that an angle of the doctor during operation is not a comfortable angle.

In this embodiment, the comfortable display angle, adjusted according to the view angle deviation, of the three-dimensional tooth image is calculated, so that a position of the three-dimensional tooth image in the three-dimensional coordinate system does not change. However, when the sight line blind region coordinates and the diseased region coordinates are displayed on the display screen 3, the sight line blind region coordinates and the diseased region coordinates are displayed according to a comfortable sight line angle of the doctor, so that when observing a tooth image on the display screen 3, the doctor may not need to excessively twist the body, thereby improving comfort of the doctor observing the image on the display screen 3.

It should be noted that the doctor may not need to focus on healthy teeth, but mainly on the diseased region and the sight line blind region range. Therefore, the display screen 3 displays the sight line blind region coordinates or the diseased region coordinates at the comfortable display angle.

Based on the seventh embodiment of the present invention, in an eighth embodiment of the dental image display method of the present invention, the step S1300 includes:

step S1310: establishing a first reference direction based on the sight line direction that is determined according to the doctor coordinates;

step S1320: establishing a second reference direction based on a front-rear direction of the three-dimensional tooth image;

step S1330: obtaining an operating included angle between the first reference direction and the second reference direction; and step S1340: using the operating included angle as the view angle deviation.

The second reference direction established based on the front-rear direction of the three-dimensional tooth image refers to the direction of the x axis.

The doctor coordinates refer to coordinates in a left-right side direction of the head portion of the doctor. The sight line direction determined according to the doctor coordinates is a direction perpendicular to the doctor coordinates, that is, it is considered that the sight line direction is perpendicular to the left-right side direction of the doctor, that is, a front-rear side direction of the doctor.

Based on the eighth embodiment of the present invention, in a ninth embodiment of the dental image display method of the present invention, the step S940 includes:

step S941: obtaining binoculus coordinates of the doctor, and calculating binoculus midpoint coordinates of the doctor and the sight line direction of the doctor according to the binoculus coordinates of the doctor; and step S942: constructing the doctor sight line range in the three-dimensional coordinate system according to the set observation view angle, the binoculus midpoint coordinates of the doctor, and the sight line direction of the doctor; and the step S1120 includes:

step S1121: displaying the coverage situation of the three-dimensional tooth image in the oral environment in the three-dimensional coordinate system;

step S1122: determining the sight line blind region range of the doctor according to the coverage situation of the three-dimensional tooth image in the oral environment and a blocking range for the doctor sight line range, and calculating the sight line blind region coordinates of the doctor according to a coordinate point within the sight line blind region range.

Referring to FIG. 8, after the doctor coordinates (a black circle position in FIG. 8) are determined in the three-dimensional coordinate system, the doctor sight line range (referring to a conical region in FIG. 8) can be determined according to the doctor coordinates and the set observation view angle.

The coverage situation (referring to a blocking region enclosed by two curves in FIG. 8, since the doctor coordinates are located on a left side, a situation that the three-dimensional tooth image is covered by a left-side lip in FIG. 8 is mainly considered herein, and a coverage range is in the blocking region enclosed by the two curves on the left side) of the three-dimensional tooth image in the oral environment is simulated, and the sight line blind region of the doctor can be determined according to the doctor sight line range and the coverage situation of the three-dimensional tooth image in the oral environment. Therefore, the sight line blind region coordinates in the sight line blind region can be determined according to a sight line blind region of the three-dimensional tooth image.

Specifically, after binoculus positions in the doctor image are recognized, the doctor coordinates are determined by taking binoculus midpoints respectively and are represented by using the binoculus midpoint coordinates. To be specific, the doctor coordinates are limited by using a point A: left eye midpoint coordinates $(x_1, y_1, z_1)$ and a point B: right eye midpoint coordinates $(x_2, y_2, z_2)$.

The binoculus midpoint coordinates of the doctor are $(x_0, y_0, z_0)$.

A position of a gaze point is $(x', y', z')$, and a sight line direction vector $\vec{v}$ is represented as:

$$\vec{v} = (x' - x_0, y' - y_0, z' - z_0)$$

$$x_0 = x_1 + \frac{x_2 - x_1}{2};$$

$$y_0 = y_1 + \frac{y_2 - y_1}{2}; \text{ and}$$

$$z_0 = z_1 + \frac{z_2 - z_1}{2}.$$

The set observation view angle is $\theta_c$.

The sight line range is represented as a cone, a top point of the cone is the binoculus midpoint coordinates $(x_0, y_0, z_0)$, the sight line direction is the sight line direction vector, and a radius is $\theta_c$.

In addition, to achieve the above purpose, the present invention further provides a dental handpiece. The dental handpiece is communicatively connected to a processing module, and the processing module is communicatively connected to an intraoral scanner 10. The intraoral scanner 10 is provided with a light sensing component 11 and a first camera 12 disposed on a back surface of the light sensing component 11. The dental handpiece includes a main structure 1, one end of the main structure 1 is provided with a working end 6 of the dental handpiece, the other end thereof is a handheld end 8, a display screen 3 is disposed between the working end 6 and the handheld end 8 that are of the dental handpiece, a working component 9 is disposed on a front surface of the working end 6 of the dental handpiece, and a second camera 7 is disposed on a back surface of the working end 6. A positional relationship of the second camera 7 relative to the working component 9 of the dental handpiece is the same as that of the first camera 12 relative to the light sensing component 11. The processing module is configured to execute the method.

Figure 2:
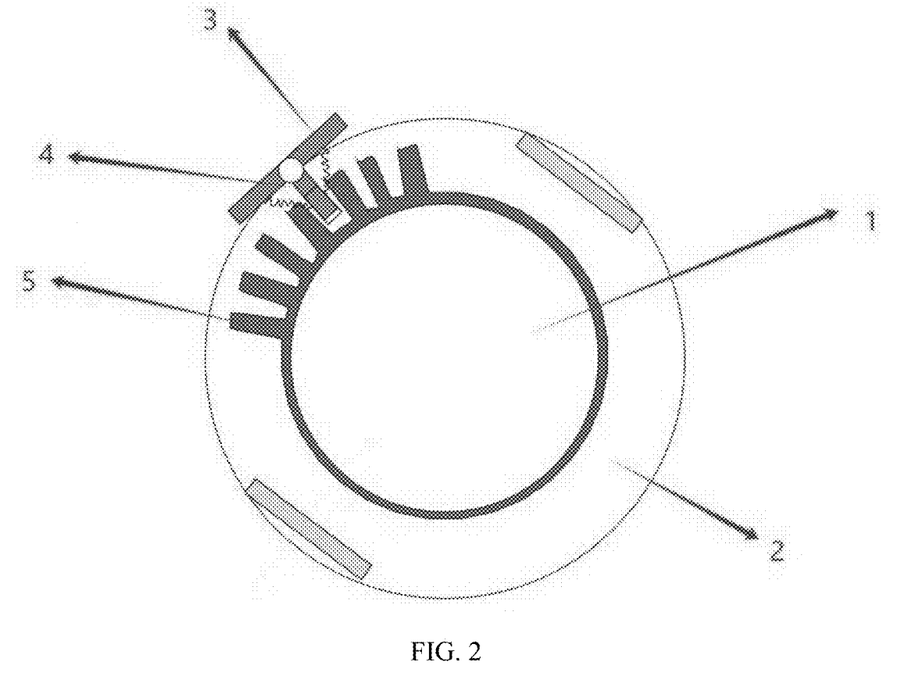
FIG. 2 is a schematic diagram in which a handheld end of a dental handpiece is connected to a display screen according to the present invention.

In a specific embodiment, the display screen 3 can rotate around an axis of the main structure 1. The display screen 3 can rotate around the axis of the main structure 1, which is convenient for the doctor to watch a screen (in a specific embodiment, a specific structure of the display screen 3 may refer to FIG. 2. As shown in FIG. 2, a sleeve ring 2 is sleeved on a periphery of the handheld end 8, a first connecting structure 5 is formed on one side, away from the main structure 1, of the sleeve ring 2, the first connecting structure 5 is configured to be connected to a second connecting structure 4, the display screen 3 is disposed on one side, away from the first connecting structure 5, of the second connecting structure 4, the display screen 3 is connected to the first connecting structure 5 by using the second connecting structure 4, and the display screen 3 is rotatably connected to the second connecting structure 4).

Further, as shown in FIG. 2, the second connecting structure 4 may be a latch, and the first connecting structure 5 may be an inserting groove. Certainly, the second connecting structure 4 and the first connecting structure 5 may further be other structures, which are similarly included in the protection scope of the present invention.

The display screen 3 may rotate around a joint in any one of directions relative to the second connecting structure 4, which is similar to a ball head structure.

The above descriptions are only preferred embodiments of the present invention and do not therefore limit the patent scope of the present invention. Any equivalent structural variation made by using the specification and the content of the accompanying drawings of the present invention, or directly or indirectly applied to other related technical fields under the concept of the present invention shall fall within the patent protection scope of the present invention.

What is claimed is:

1. A dental image display method, wherein an intraoral scanner is provided with a light sensing component and a first camera disposed on a back surface of the light sensing component; a dental handpiece comprises a main structure, one end of the main structure is provided with a working end of the dental handpiece, the other end thereof is a handheld end, a display screen is disposed between the working end and the handheld end that are of the dental handpiece, a working component is disposed on a front surface of the working end of the dental handpiece, and a second camera is disposed on a back surface of the working end; a positional relationship of the second camera relative to the working component of the dental handpiece is the same as that of the first camera relative to the light sensing component; the dental handpiece and the intraoral scanner are communicatively connected to a processing module respectively, to execute the method by using the processing module; and the method comprises the following steps:

obtaining a three-dimensional tooth image formed by scanning an oral cavity of a patient by using the light sensing component of the intraoral scanner;

obtaining a first local dental arch image collected by the light sensing component at each moving position when the light sensing component of the intraoral scanner moves along a dental arch, and obtaining a second local dental arch image collected by the first camera at each moving position, wherein the first local dental arch image is a local image of one of an upper dental arch and a lower dental arch in the three-dimensional tooth image, and the second local dental arch image is a local image of the other one of the upper dental arch and the lower dental arch in the three-dimensional tooth image;

establishing a positional association between the first local dental arch image and the second local dental arch image that are collected at each moving position, to form paired data;

obtaining a first real-time image collected by the second camera when the dental handpiece is operated in the oral cavity, and querying the paired data according to the first real-time image, to determine a local dental arch image aligned by the working component of the dental handpiece; and displaying the local dental arch image aligned by the working component of the dental handpiece on the display screen of the dental handpiece;

wherein a fourth camera configured to collect a doctor image is disposed at the handheld end of the dental handpiece; and the method further comprises:

establishing a three-dimensional coordinate system according to the three-dimensional tooth image;

calculating positional coordinates of the working end of the dental handpiece in the three-dimensional coordinate system by using the first real-time image obtained by the second camera when the working end of the dental handpiece moves at different positions in the oral cavity;

establishing the doctor image in the three-dimensional coordinate system by using the doctor image collected by the fourth camera, to determine doctor coordinates and determine a doctor sight line range;

recognizing a diseased region from the three-dimensional tooth image, and extracting diseased region coordinates, wherein the diseased region comprises a diseased tooth and surrounding tissue of the diseased tooth;

calculating sight line blind region coordinates of the three-dimensional tooth image relative to the doctor coordinates; and displaying the local dental arch image aligned by the working component of the dental handpiece and the first real-time image collected by the second camera on the display screen when the positional coordinates of
the working end of the dental handpiece are located at
an overlapped region between the sight line blind
region coordinates and the diseased region coordinates;
wherein the step of establishing the doctor image in the
three-dimensional coordinate system by using the doctor image collected by the fourth camera, to determine
doctor coordinates and determine a doctor sight line
range comprises:
obtaining the doctor image collected by the fourth camera
at each set moment;
obtaining a position of the working end of the dental
handpiece in the three-dimensional coordinate system
at each set moment;
converting the doctor image at each set moment to the
three-dimensional coordinate system according to the
positional coordinates of the working end of the dental
handpiece in the three-dimensional coordinate system,
to determine the doctor coordinates; and
determining the doctor sight line range according to the
doctor coordinates and a set observation view angle;
wherein the step of calculating sight line blind region
coordinates of the three-dimensional tooth image relative to the doctor coordinates comprises:
simulating a coverage situation of the three-dimensional
tooth image in an oral environment according to the
three-dimensional tooth image; and
determining the sight line blind region coordinates of a
doctor according to the doctor sight line range and the
coverage situation of the three-dimensional tooth
image in the oral environment;
wherein the method further comprises:
calculating a view angle deviation between the doctor
coordinates and the three-dimensional tooth image; and
calculating a comfortable display angle, adjusted according to the view angle deviation, of the three-dimensional tooth image; and
the step of displaying the local dental arch image aligned
by the working component of the dental handpiece and
the first real-time image collected by the second camera
on the display screen when the positional coordinates
of the working end of the dental handpiece are located
at an overlapped region between the sight line blind
region coordinates and the diseased region coordinates
comprises:
displaying, according to the comfortable display angle,
the local dental arch image aligned by the working
component of the dental handpiece and the first real-time image collected by the second camera on the
display screen when the positional coordinates of the
working end of the dental handpiece are located at the
overlapped region between the sight line blind region
coordinates and the diseased region coordinates.

2. The dental image display method according to claim 1,
wherein a third camera is further disposed on one side, close
to the working end, of the dental handpiece, and the third
camera is configured to shoot an image of the working
component mounted at the working end of the dental handpiece; the method further comprises:
obtaining a second real-time image collected by the third
camera when the dental handpiece is operated in the
oral cavity, wherein the second real-time image is a
working image of the working component mounted at
the working end of the dental handpiece in a local
dental arch; and the step of displaying the local dental arch image aligned
by the working component of the dental handpiece on
the display screen of the dental handpiece comprises:
obtaining a display image of the working component in
the local dental arch through processing according to
the local dental arch image aligned by the working
component of the dental handpiece and the second
real-time image; and
displaying the display image of the working component in
the local dental arch on the display screen of the dental
handpiece.

3. The dental image display method according to claim 1,
wherein the step of establishing a three-dimensional coordinate system according to the three-dimensional tooth
image comprises:
establishing a reference surface in the three-dimensional
tooth image based on the lower dental arch, and determining a direction of an x axis of the three-dimensional
coordinate system in the reference surface based on a
central line of the lower dental arch;
determining a direction of a y axis of the three-dimensional coordinate system in the reference surface based
on a direction that is from a left tooth socket to a right
tooth socket;
determining a direction of a z axis of the three-dimensional coordinate system based on a direction that is
perpendicular to the x axis and the y axis respectively;
and
establishing the three-dimensional coordinate system
according to the direction of the x axis, the direction of
the y axis, the direction of the z axis, and a selected
coordinate origin.

4. The dental image display method according to claim 1,
wherein the step of calculating a view angle deviation
between the doctor coordinates and the three-dimensional
tooth image comprises:
establishing a first reference direction based on a sight
line direction that is determined according to the doctor
coordinates;
establishing a second reference direction based on a
front-rear direction of the three-dimensional tooth
image;
obtaining an operating included angle between the first
reference direction and the second reference direction;
and
using the operating included angle as the view angle
deviation.

5. The dental image display method according to claim 4,
wherein the step of determining the doctor sight line range
according to the doctor coordinates and a set observation
view angle comprises:
obtaining binoculus coordinates of the doctor, and calculating binoculus midpoint coordinates of the doctor and
the sight line direction of the doctor according to the
binoculus coordinates of the doctor; and
constructing the doctor sight line range in the three-dimensional coordinate system according to the set
observation view angle, the binoculus midpoint coordinates of the doctor, and the sight line direction of the
doctor; and
the step of determining the sight line blind region coordinates of a doctor according to the doctor sight line
range and the coverage situation of the three-dimensional tooth image in the oral environment comprises:
displaying the coverage situation of the three-dimensional
tooth image in the oral environment in the three-dimensional coordinate system;

determining a sight line blind region range of the doctor according to the coverage situation of the three-dimensional tooth image in the oral environment and a blocking range for the doctor sight line range, and calculating the sight line blind region coordinates of the doctor according to a coordinate point within the sight line blind region range.

6. A dental handpiece, wherein the dental handpiece is communicatively connected to a processing module, and the processing module is communicatively connected to an intraoral scanner; the intraoral scanner is provided with a light sensing component and a first camera disposed on a back surface of the light sensing component; the dental handpiece comprises a main structure, one end of the main structure is provided with a working end of the dental handpiece, the other end thereof is a handheld end, a display screen is disposed between the working end and the handheld end that are of the dental handpiece, a working component is disposed on a front surface of the working end of the dental handpiece, and a second camera is disposed on a back surface of the working end; a positional relationship of the second camera relative to the working component of the dental handpiece is the same as that of the first camera relative to the light sensing component; and the processing module is configured to execute the method according to claim 1.

* * * * *